US006304866B1

United States Patent
Chow et al.

(10) Patent No.: US 6,304,866 B1
(45) Date of Patent: Oct. 16, 2001

(54) AGGREGATE JOB PERFORMANCE IN A MULTIPROCESSING SYSTEM BY INCREMENTAL AND ON-DEMAND TASK ALLOCATION AMONG MULTIPLE CONCURRENTLY OPERATING THREADS

(75) Inventors: Jyh-Herng Chow, San Jose, CA (US); John Frederick Hornibrook, Toronto (CA); Bruce Gilbert Lindsay, San Jose, CA (US); Geoffrey Peddle, San Jose, CA (US); Eugene Jon Shekita, San Jose, CA (US); Amit Somani, San Jose, CA (US); Surendra Kumar Verma, Bellevue, WA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/884,602

(22) Filed: Jun. 27, 1997

(51) Int. Cl.[7] .................................................. G06F 17/30
(52) U.S. Cl. ........................................... 707/2; 707/3
(58) Field of Search ................... 707/1, 2, 3, 4, 707/10, 100, 101, 103; 709/100, 101, 102, 103, 104, 105, 106, 107, 108; 701/200, 207, 209

(56) References Cited

U.S. PATENT DOCUMENTS

| 5,857,180 | * | 1/1999 | Hallmark et al. | 707/2 |
| 5,903,888 | * | 5/1999 | Cohen et al. | 707/3 |
| 5,918,225 | * | 6/1999 | White et al. | 707/3 |
| 5,963,948 | * | 10/1999 | Shilcrat | 707/2 |
| 6,115,705 | * | 9/2000 | Larson | 707/3 |

OTHER PUBLICATIONS

Bezenchek et al, "A data structure for representing aggregate data", IEEE, pp. 22–31, 1996.*
Shatdal et al, "Adaptive parallel aggregation algorithms", 1995.*
Shatdal et al, "Processing inparallel database systems", 1994.*
Oracle, "Oracle8: The hub of Oracle warehouse: an Oracle technical white paper", Jun. 1997.*

* cited by examiner

Primary Examiner—Majid Banankhah
(74) Attorney, Agent, or Firm—Baker Maxham Jester & Meador

(57) ABSTRACT

In a multiprocessing system, multiple concurrently operating task execution units are operated to perform an aggregate task by using incremental and on-demand sub-task allocation. A command is received to perform a machine-executed task divisible into multiple sub-tasks, i.e., an "aggregate task". A granularity is then established, for dividing the aggregate task into sub-tasks. Preferably, the granularity is not too large to permit potentially uneven sub-task allocation, and not too small to incur excessive overhead in allocating sub-tasks. Having established the granularity, multiple task execution units are independently operated on-demand to sequentially self-allocate and execute sub-tasks of the aggregate tasks. Each sub-task is sized according to the established granularity. Operating "on-demand", each task execution unit sequentially allocates and executes one sub-task at a time, then proceeding to the next unexecuted sub-task. Thus, the multiprocessing system operates like multiple people drinking water from a common glass through individual straws—although each drinker works independently, all finish simultaneously, thus completing the aggregate task as expeditiously as possible.

43 Claims, 6 Drawing Sheets

AGGREGATE JOB PERFORMANCE IN A MULTIPROCESSING SYSTEM BY INCREMENTAL AND ON-DEMAND TASK ALLOCATION AMONG MULTIPLE CONCURRENTLY OPERATING THREADS

BACKGROUND OF THE INVENTION

1. Field of the Invention

The present invention relates to multiprocessing computer database systems. More particularly, the invention concerns a method, apparatus, and article of manufacture for performing an aggregate database processing task with multiple concurrently operating task execution units, using incremental and on-demand sub-task allocation. This is also referred to as "straw model" data processing.

2. Description of the Related Art

Most database tasks cannot be judged by their accuracy alone. Task completion time is of paramount importance to purchasers, testers, developers, and other users of computer programs. The time to complete a task or sub-task has a number of names, including throughput, response time, execution time, and task completion time. By any name, engineers and scientists are constantly seeking new ways to minimize their applications' task completion time.

Reducing task completion time is especially challenging in "multiprocessing environments", which refer to computer systems where multiple computers, digital data processing units, threads, or other processes perform concurrent tasks. For ease of discussion, the term "program execution threads" is used to refer to these and other arrangements, where some or all of hardware device performs a specific task by executing an instruction stream. "Threads" is a known shorthand term. In multi-thread systems, one important consideration is how to apportion the work among the various concurrently operating threads. Typically, workload is apportioned by somehow logically dividing the data to be processed. For example, a block of data might be divided evenly into a number of parts equal to the number of available threads, so that each thread can independently process a separate portion of the data. This is called "static" or "a priori" partitioning.

Such apportionment of work is rarely completely balanced. One reason is that the extent of the data may be difficult to ascertain, or the data's processing time may be otherwise difficult to predict. Furthermore, even equisized data subparts may require comparatively different processing times. As a result of this lack of balance, some threads finish early, and other threads labor for longer periods. Still, the overall job is not complete until all threads have finished, including the last to finish its respective task. Thus, even though some threads complete their work early, other threads linger on, delaying completion of the ultimate task. One name for this phenomenon is called "workload skew". For users seeking faster execution of their multi-thread application programs, workload skew is a significant problem area.

SUMMARY OF THE INVENTION

Broadly, the present invention concerns the performance of an aggregate database processing task in a multiprocessing computer database system. The aggregate task is executed with multiple concurrently operating task execution units, using incremental and on-demand sub-task allocation. A command is received to perform a machine-executed task divisible into multiple sub-tasks, i.e., an "aggregate task". Then, multiple task execution units are independently operated on-demand to sequentially self-allocate and execute sub-tasks of the aggregate task. Each sub-task is sized according to a specific "granularity", used to divide the aggregate task into sub-tasks. The granularity may be predetermined for all task execution units or repeatedly dynamically determined by each task execution unit at the time of self-allocation. Preferably, the granularity is not too large as to cause potentially uneven sub-task allocation, and not so small as to incur excessive overhead in allocating sub-tasks.

Operating "on-demand", each task execution unit sequentially allocates and executes one sub-task at a time, then proceeding to allocate the next unallocated pice of work to itself according to the appropriate granularity. Thus, the multiprocessing system operates like multiple people drinking water from a common glass through individual straws—although each drinker works independently, all finish simultaneously, thus completing the aggregate task as expeditiously as possible.

In one implementation, each task execution unit operates as follows. First, the task execution unit selects an unexecuted sub-task of the aggregate task, where the sub-task is sized according to the appropriate granularity. Then, the task execution unit executes the selected sub-task. After executing the sub-task, the task execution units determines whether any available work of the aggregate task remains. As long as available work of the aggregate task remain, the selection and allocation steps are repeated.

In one embodiment, the invention may be implemented to provide a method for machine-executed completion of an aggregate task. In another embodiment, the invention may be implemented to provide an apparatus including a multiprocessing system for machine-executed completion of an aggregate task. In still another embodiment, the invention may be implemented to provide a programmed product comprising signal-bearing media tangibly embodying a program of machine-readable instructions executable by a digital data processing apparatus to perform method steps for machine-executed completion of an aggregate task.

The invention affords its users with a number of distinct advantages. Chiefly, the invention guides a multiprocessing system to perform an aggregate task as quickly as possible, with minimum workload skew among independently operating processing elements. Furthermore, the straw model is particularly well suited to subsequent database operations such as the nested loop join, merge join, hash join, group-by, index and-ing/or-ing, etc. The invention also provides a number of other advantages, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections
Multiprocessing Environment

Figure 1:
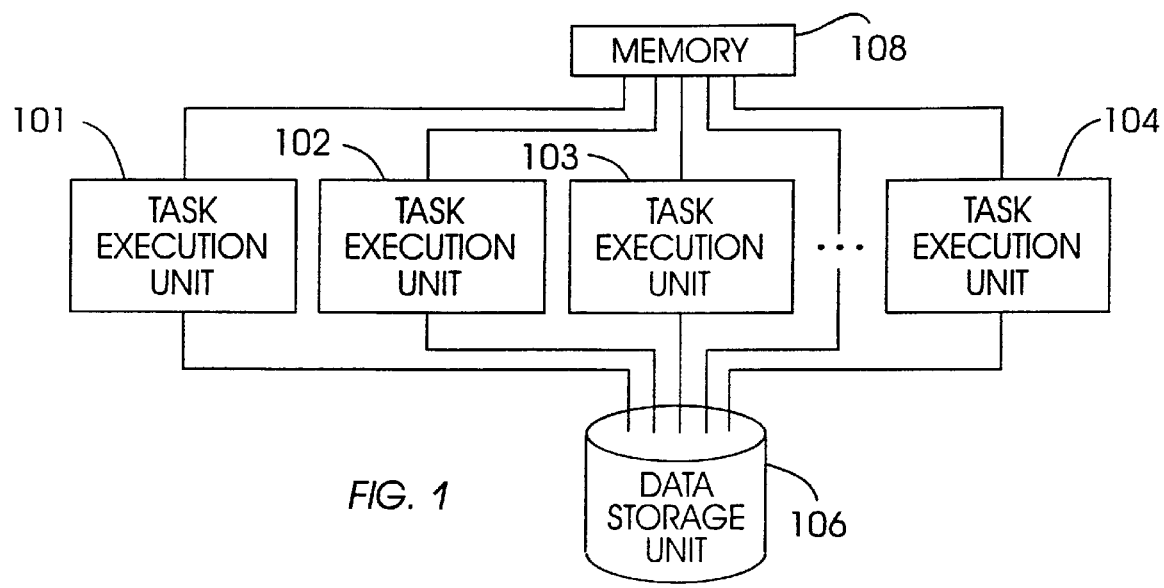
FIG. 1 is a diagram of a multiprocessing system according to the invention.

One aspect of the invention concerns a multiprocessing system, which may be embodied by various hardware components and interconnections of the multiprocessing system 100 described in FIG. 1. The multiprocessing system 100 includes multiple task execution units 101–104, each coupled to a data storage unit 106. The task execution units 101–104 comprise electronic devices or processes for executing a sequence of data processing tasks. This data is stored on the data storage unit 106, and may be stored in the form of database tables, for instance. The data storage unit 106 comprises one or more devices for electronically storing data, such as an integrated circuit memory, magnetic hard drive, optical disk drive, magnetic or optical tape, etc.

As described below, the task execution units 101–104 may advantageously be used for transferring data from the data storage unit 106 to another data storage facility, as well as performing optional manipulation of the data in transit. Preferably, then, the task execution units 101–104 are also coupled to a memory 108, for use in loading data from the data storage unit 106. As shown below, the task execution unit 101–104 may be operated to scan data from database tables, indices, or other data structures in the data storage unit 106, and assemble the data into the memory 108. Preferably, then, the memory 108 comprises fast-access memory such as RAM, commonly accessible to all task execution unit 101–104. Nonetheless, depending upon the needs of the application, the memory 108 may comprise any device for electronically storing data, such as an integrated circuit memory, magnetic hard drive, optical disk drive, magnetic or optical tape, etc.

Exemplary Task Execution Unit

The task execution units 101–104 may be implemented in a number of different ways, depending upon the specific needs of the application. As an example, each task execution unit may comprise a separate process or "thread", representing an instruction stream executed by a hardware device. Furthermore, multiple task execution units may be implemented by a single multi-tasking hardware device.

Each task execution unit may also comprise a hardware device such as a computer, microprocessor, programmed memory, discrete circuitry, application-specific integrated circuitry, programmable circuit components, logic circuitry, a combination of the foregoing, or another suitable digital data processing machine.

Figure 2:
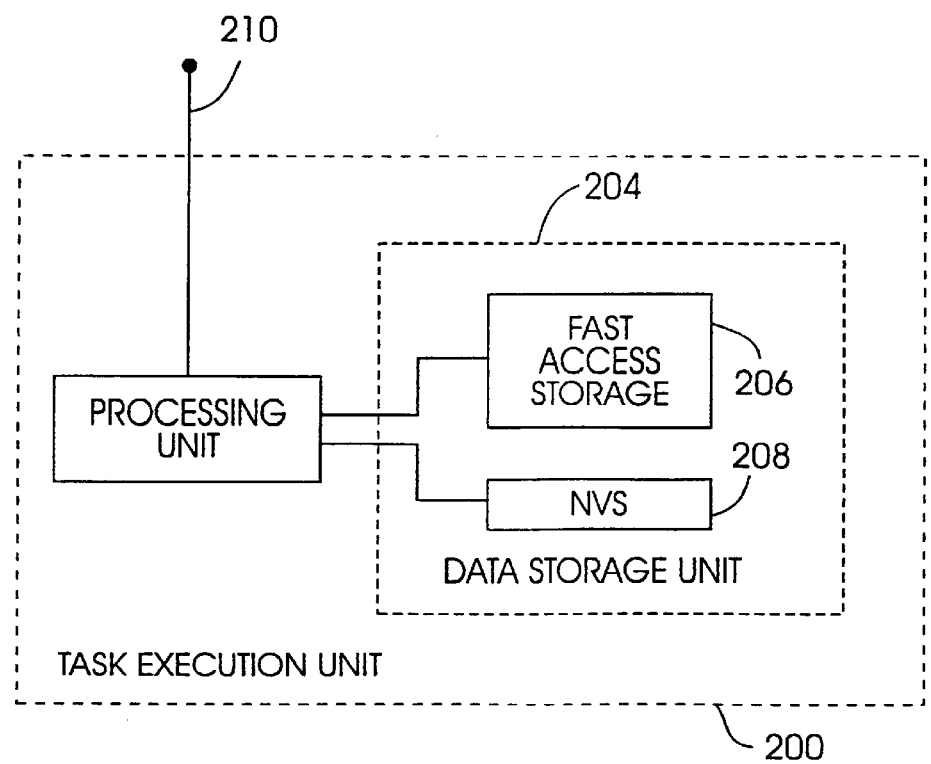
FIG. 2 is a diagram of an illustrative task execution unit according to the invention.

FIG. 2 depicts an exemplary task execution unit 200, representing one particular hardware embodiment of the task execution units 101–104. The task execution unit 200 includes a processing unit 202, such as a microprocessor or other processing machine. As a specific example, the processing unit 202 may comprise a 64-bit IBM Power-PC microprocessor chip.

The processing unit 202 is coupled to a storage unit 204. In the present example, the storage unit 204 includes a fast-access storage unit 206 and a nonvolatile storage unit 208. The fast-access storage unit 206 preferably comprises random access memory, and may be used to store the programming instructions executed by the processing unit 202 during such execution. The nonvolatile storage unit 208 may comprise, for example, one or more magnetic data storage disks such as a "hard drive", a tape drive, or any other suitable storage device. The task execution unit 200 also includes an input/output 210, such as a line, bus, cable, electromagnetic link, or other means for exchanging data with the processing unit 202.

Despite the specific foregoing description, ordinarily skilled artisans (having the benefit of this disclosure) will recognize other implementations of the task execution unit 200, without departing from the scope of the invention. As a specific example, one of the storage units 206/208 may be eliminated; furthermore, the processing unit 202 may be provided with on-board storage, even though the storage unit 204 is shown separate from the processing unit 202.

Operation

In addition to the various hardware embodiments described above, a different aspect of the invention concerns a method for performing an aggregate database processing task with multiple concurrently operating processes, using incremental and on-demand sub-task allocation.

Signal-Bearing Media

Such a method may be implemented, for example, by operating the task execution units 101–104 of the multiprocessing system 100 to execute appropriate sequences of machine-readable instructions. These instructions may reside in various types of signal-bearing media, either common or individual to the task execution units 101–104, as desired. In this respect, one aspect of the present invention concerns a programmed product, comprising signal-bearing media tangibly embodying a program of machine-readable instructions executable by one or more digital data processors to perform an aggregate task with multiple concurrently operating processes, using incremental and on-demand sub-task allocation.

Figure 3:
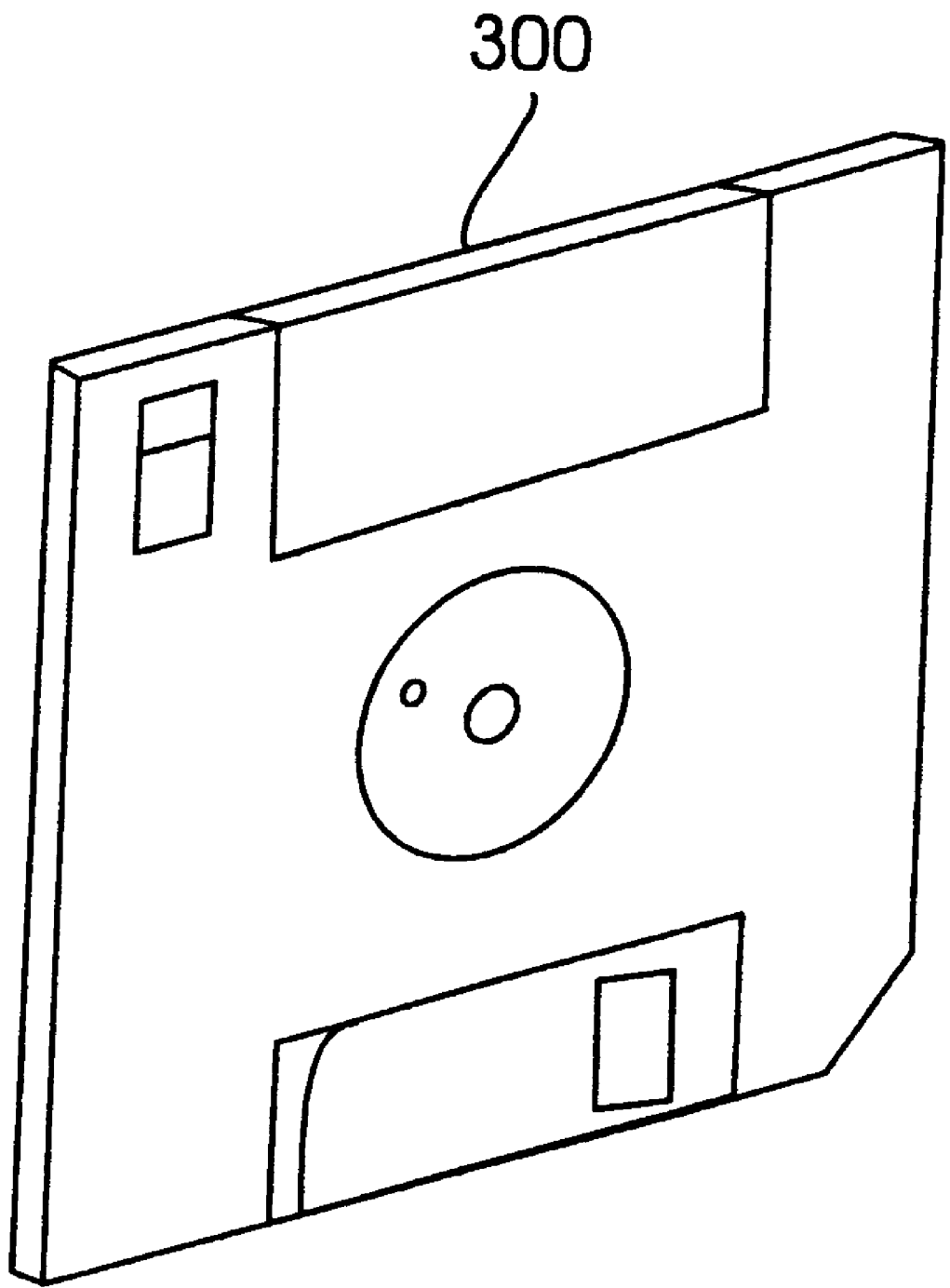
FIG. 3 is a diagram of an exemplary signal-bearing medium in accordance with the invention.

This signal-bearing media may comprise, for example, RAM provided by the fast-access storage 206 of each task execution unit 200. Alternatively, the instructions may be contained in another signal-bearing media, such as a magnetic data storage diskette 300 (FIG. 3). Whether contained in the fast-access storage 206 or elsewhere, the instructions may instead be stored on another type of data storage medium such as DASD storage (e.g., a conventional "hard drive" or a RAID array), magnetic tape, electronic read-only memory (e.g., CD-ROM or WORM), an optical storage device (e.g. WORM), paper "punch" cards, or other suitable signal-bearing media including transmission media such as digital and analog and communication links and wireless. In an illustrative embodiment of the invention, the machine-readable instructions may comprise lines of compiled C++ language code.

Overall Sequence of Operation

Figure 4:
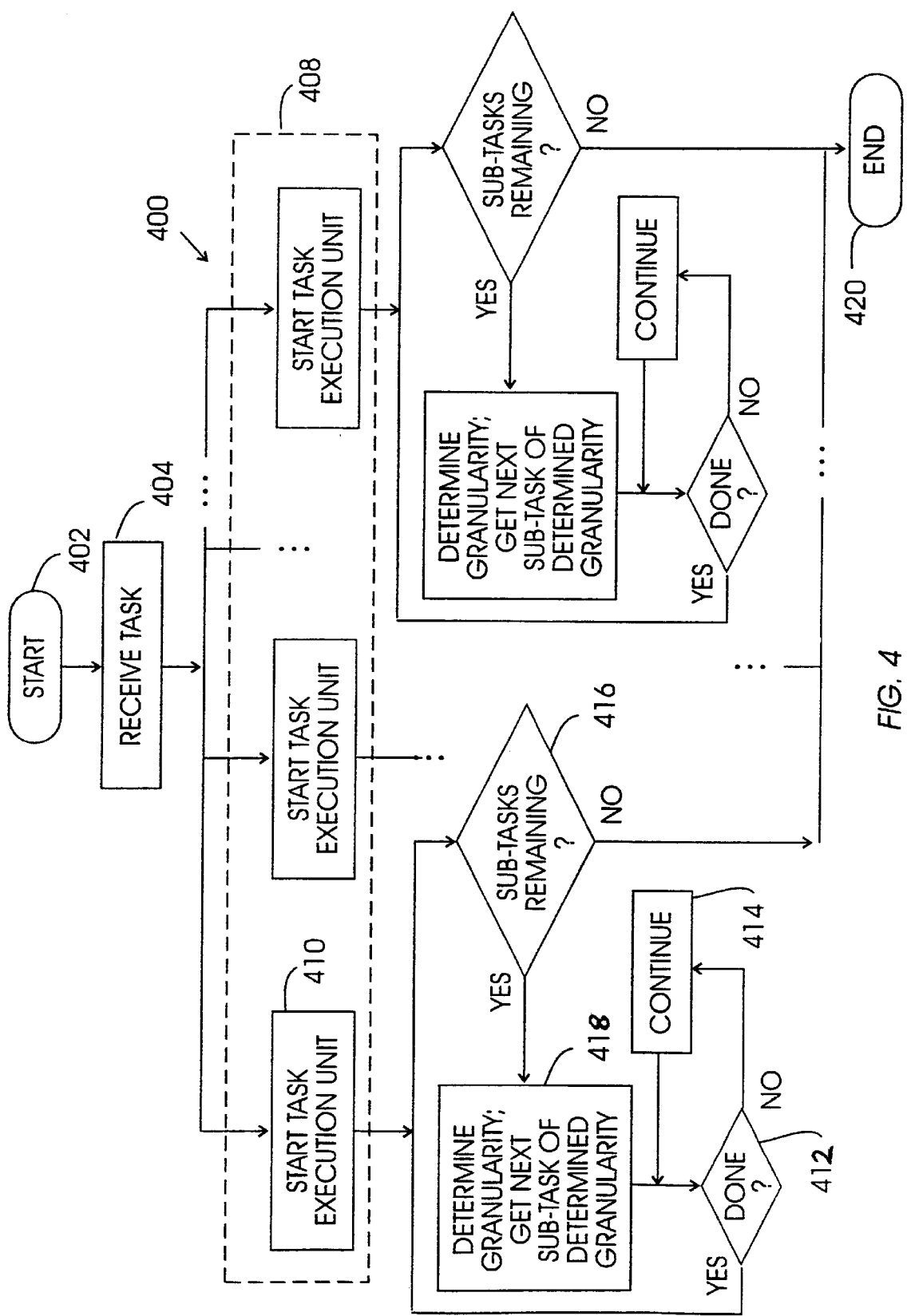
FIG. 4 is a flowchart illustrating an overall method for aggregate database processing task performance in a multiprocessing system by incremental and on-demand task allocation among multiple concurrently operating task execution units, according to the invention.

FIG. 4 depicts a sequence of method steps 400 to illustrate one example of the method aspect of the present invention. For ease of explanation, but without any limitation intended thereby, the example of FIG. 4 is described in the context of the multiprocessing system 100 described above, using task execution units 200. Generally, the method sequence 400 is used to perform an aggregate database processing task, by breaking the task down into smaller units, and executing the units with multiple concurrently operating task execution units.

Receiving Aggregate Task

After the steps 400 are initiated in task 402, step 404 receives the aggregate task. This may involve, for example, receipt of the task-to-be-performed by the task execution units 101–104, or by a central host (not shown) coupled to the task execution units 101–104.

Concurrent Processing by Task Execution Units

After step 404, step 408 concurrently begins processing the aggregate task by concurrently starting each of the task execution units 101–104 on different sub-tasks. When a task execution unit finishes its sub-task, it embarks on another sub-task, if any remain. Thus, the multiprocessing system 100 functions like a "straw model", with several people drinking water from a common glass through individual straws. As a result, all task execution units work together, and finish at substantially the same time.

The work of an individual task execution unit 200 is described as follows, with reference to steps 410–420. After the task execution unit 200 starts in step 410, step 416 asks whether any work from the aggregate task remains to be processed. If not, the task execution unit 200 quits in step 420.

Determining Granularity Unit

Otherwise, if step 416 finds work remaining, the task execution unit 200 in step 418 determines a unit of granularity for the next sub-task to be processed, and then, using the determined granularity, obtains the sub-task from the aggregate task. By obtaining the sub-task from the aggregate task, the task execution unit 200 self-allocates the sub-task. The size of the next sub-task to be processed is dictated by a corresponding granularity unit, also determined in step 418.

As an example, each unit of granularity may comprise one of the following: (1) a storage size of data to be processed (e.g., bits or bytes), (2) if the aggregate task naturally has subparts, a number of such subparts for processing (e.g., six subparts), or (3) another convenient unit. In computer database applications, for example, the unit of granularity may comprise a page of rows, a single row, or a fixed number of multiple rows of a table, or any other convenient subset of the rows of a table.

As step 418 determines a granularity unit anew for each sub-task, each sub-task may have a different size. Step 418 is thus seen to "dynamically" self-allocate sub-tasks to the task execution unit.

The granularity determinations of task 418 are important to ensure the efficient completion of the aggregate task, and may be performed, for example, based on a predictive or empirical analysis. Care is preferably taken to avoid an excessively large granularity unit, which may result in an inequitable distribution of table rows among the task execution units 101–104. It is desirable to have a small granularity, so that the task execution units return to step 418 many times to obtain new work. Thus, if one of the task execution units 101–104 encounters difficulty in processing a particular sub-task, the other task execution units meanwhile repeatedly perform other sub-tasks and thus prevent the the overall performance of the aggregate task from suffering. Care is exercised, however, to avoid granularity units that are too small, since the corresponding sub-tasks would require excessive allocation overhead and thereby slow the overall data processing speed.

As mentioned above, each task execution unit may dynamically self-allocate sub-tasks by determining a granularity unit anew for each sub-task, each sub-task thus having a different size. As one example, granularity may vary with time, starting with a large granularity which decreases with time. This helps to ensure that all task execution units finish substantially concurrently.

In another embodiment of the invention, all task execution units 101–104 may utilize a common, fixed granularity. For example, a large granularity may be used for large aggregate tasks, and a relatively small granularity may be used for small aggregate tasks. Alternatively, one or more task execution unit 101–104 may utilize a fixed granularity unit different than the other task execution units 101–104. As an example, task execution units with superior efficiency or processing power may use a larger sized granularity. With a fixed granularity, the granularity may even be determined in advance by a central host (not shown), avoiding the need to determine granularity in step 418.

Completion of Sub-Tasks

After determining granularity (if applicable) and self-allocating the next sub-task, the task execution unit 200 in step 418 commences performance of the allocated sub-task. Next, step 412 asks whether the task execution unit 200 is finished with the first sub-task. If not, the task execution unit 200 continues executing the current sub-task in step 414.

When step 412 determines that the unit 200 has finished the first sub-task, step 416 asks whether any sub-tasks of the aggregate task remain to be processed. If no unexecuted sub-tasks remain, the task execution unit 200 retires in step 420. Otherwise, if more sub-tasks remain, the task execution unit 200 in step 418 self-allocates a new sub-task and begins to execute it.

Thus, as shown above, the aggregate task is not allocated among the task execution units in advance. Instead, the aggregate task is broken into increments (i.e., sub-tasks), which are incrementally allocated to the task execution units "on demand". In other words, the task execution unit 200 operates "on-demand" by sequentially allocating and executing one sub-task at a time, then proceeding to the next unexecuted sub-task.

Database Examples

The present invention is especially useful when applied to a table, index, or other data structure comprising data elements each of which can be separately processed. The following description explains a number of such applications.

Table Scan

The "Table Scan" operation moves rows of tables from one storage location to another. Table Scan may be used, for example, to retrieve table data from nonvolatile storage to RAM. This retrieval provides a process or "thread" with access to the data, so that the process can perform various operations on the data. These operations, for example, may involve sort, group, join, and other database query processing steps. Table Scan may be performed with granularity of one row, multiple rows, all rows on one page, or another appropriate unit of the underlying table data.

Index Scan

To improve the accessibility of computer databases, their table data is typically indexed. The "Index Scan" operates similar to Table Scan, moving data from one storage location to another. However, Index Scan deals with indices, whereas Table Scan moves table data.

An index includes a plurality of pointers, which effectively point to rows of a corresponding table. Entries of the index are grouped into pages. Each entry has a key, which usually comprises a code identifying a particular row in the table corresponding to the index. As an example, this code may comprise a primary key value, or it may comprise the contents of any field(s) of the corresponding row itself.

Determining the granularity for Index Scan operations is especially difficult. One reason is the amount of entries in a given range of the index may vary from other ranges of the same apparent size. For instance, if the index references last names, there may be many names beginning with "M", but few names beginning with "Q". Therefore, if the granularity includes all last names starting with a particular letter, the distribution of work among the task execution units will probably be uneven.

Thus, with Index Scans, it is important to establish a sufficiently small granularity to avoid workload skew. Index Scan may be performed, for example, with granularity of N entries (pointers), all entries for a given key value, all entries on a page, etc.

Multi-Level Processing

In database processing, table data is often accessed, modified, or otherwise processed, and used as input to subsequent query processing steps. These include steps such as sorting, joining, communicating, filtering, and grouping data items. This type of processing, where subsequent processing depends upon the results from prior processing, is called "pipeline" processing. One aspect of the invention involves assigning task execution units to perform the processing steps involved in a particular pipeline.

The preferred approach to pipeline processing uses each task execution unit to perform as much processing as possible for each item of data allocated to that task execution unit. This is called "local processing". In general, it is most efficient to perform as many processing steps locally as possible, in order to minimize the costs of redistributing work among the task execution units.

"Multi-level" processing involves the coupling of pipelines of local processing steps via various pooling and redistribution techniques, as described below. Generally, the multi-level processing paradigm of the invention uses the straw model to allocate a first level of work among the task execution units. Then, results of the first-level work are pooled and redistributed among the task execution units. Results from each previous processing level are thus sequentially "pooled" and re-allocated for pipelined local processing by task execution units as a new aggregate task. Although not required, redistribution of work may also be performed according to the straw model. After all work is performed, results are pooled for possible final processing steps and to present as a final output.

Figure 5:
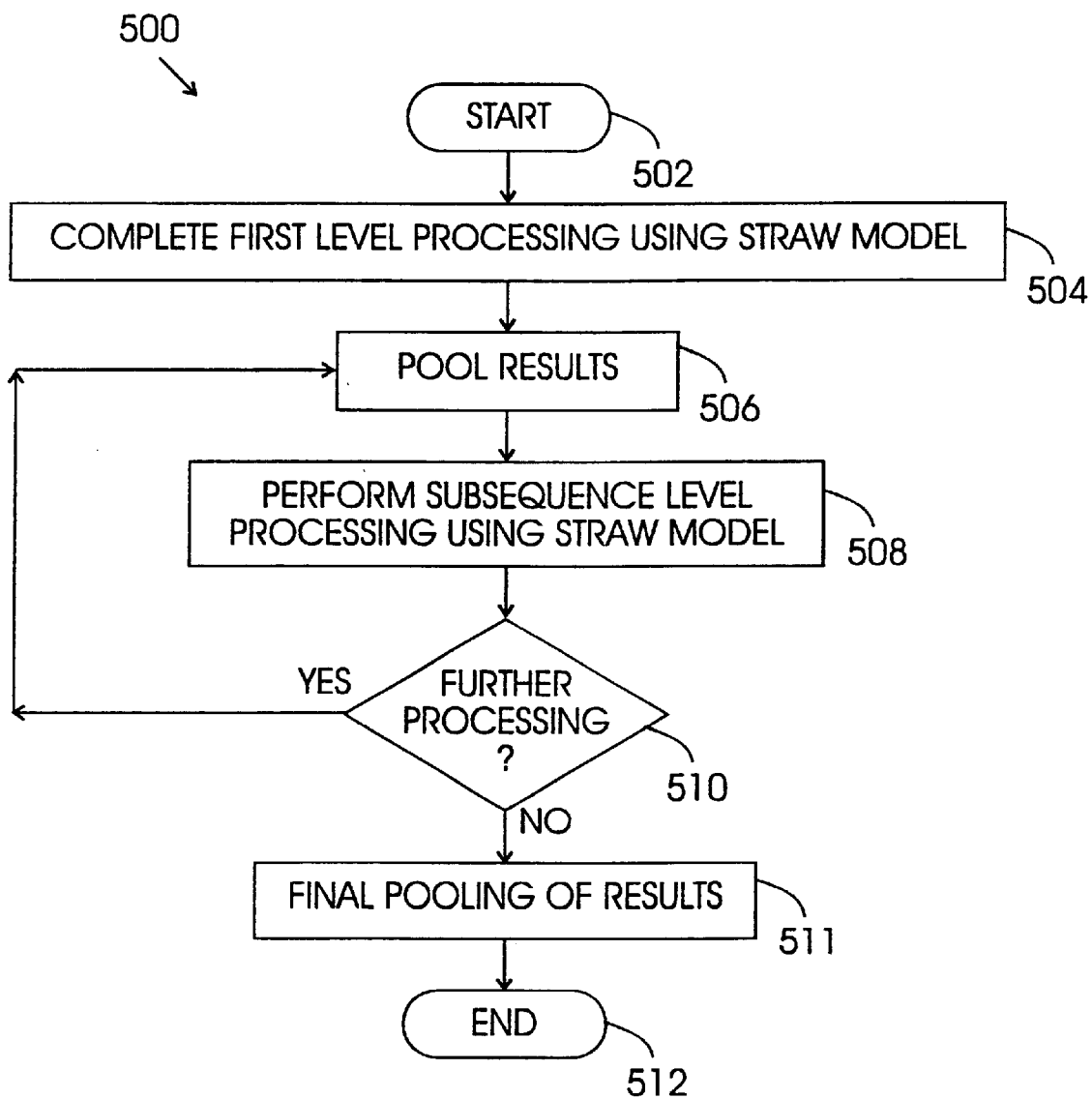
FIG. 5 is a flowchart illustrating a pool and redistribute technique for multi-level processing according to the invention.

FIG. 5 takes a more detailed look at multi-level processing according to the invention. After the sequence 500 begins in step 502, step 504 initially processes the table, index, or other data structure. Preferably, allocation of work in step 504 may be performed according to the straw model of the invention, using the routine 400 (FIG. 4) until all remaining processing depends upon the results of the initial processing. This completes the first "level" of processing.

Then, step 506 treats the subsequent work as an aggregate task, effectively "pooling" the results from step 504. The subsequent work is performed in step 508. Optionally, if desired, this may be achieved using incremental and on-demand allocation among the task execution units according to FIG. 4, or by another static or dynamic partitioning of the pooled results. Depending upon the needs of the application, step 508 may employ the granularity established in step 504, or another newly established granularity.

If step 510 finds that further processing still remains, the intermediate results are again pooled in step 506, and step 508 repeated. Steps 506 and 508 are repeated until processing of the data structure is completed. At this point, task 511 pools the results for final output, then, the routine 500 ends in step 512.

Pooling and redistribution of data according to the invention may be performed by various different techniques, including but not limited to those shown below.

Partition Sort ("P-Sort")

One mechanism to pool and redistribute data during multi-level processing is the partition sort technique, referred to as "p-sort". Broadly, the p-sort approach divides the data into sorted partitions according to a predetermined criteria, then assigns each partition to a task execution unit. The partitions are commonly accessible by all task execution units 101–104. Preferably, each partition is structured to include multiple sort trees, thus avoiding concurrency conflicts from multiple task execution units simultaneously attempting to store data in the same partition. Each task execution unit merges and orders its assigned data, and then performs the necessary subsequent processing of that data.

Figure 6:
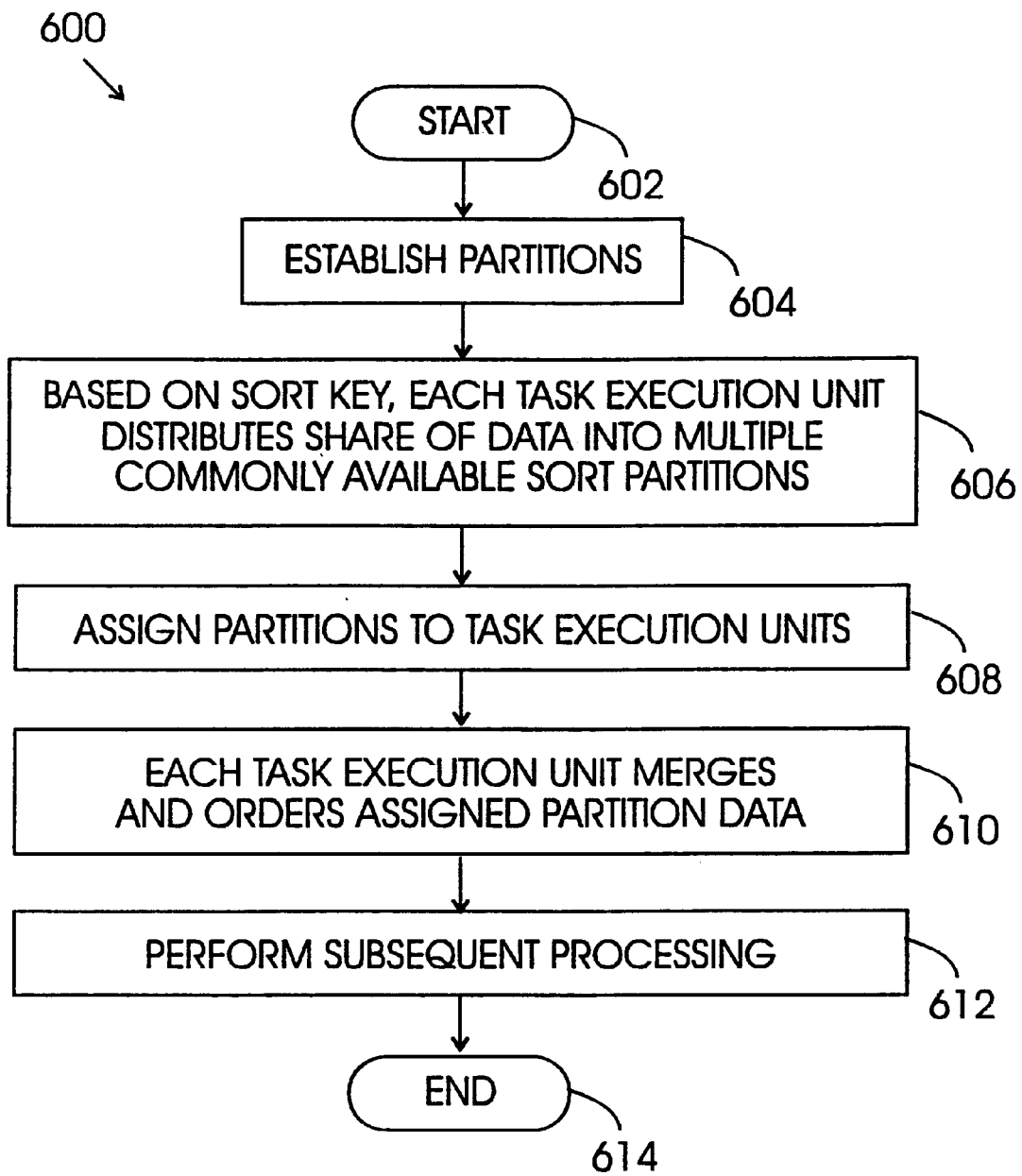
FIG. 6 is a flowchart illustrating a partition sort technique for multi-level processing according to the invention.

FIG. 6 shows this process in greater detail. After the routine 600 starts in step 602, step 604 establishes the partitions. As shown below, each of the task execution units 101–104 stores data from the input source into one of these partitions according to a predetermined criteria. The input source may comprise a table, index, or another data structure. Preferably, the selection of the partitions is achieved by hashing a sort key. Alternatively, it may be useful to select the partitions according to the storage units containing the rows being sorted or another suitable criteria.

In step 606, each of the task execution units 101–104 stores data from the input source into sort partitions according to the sort key defined in step 604. More particularly, each task execution unit operates according to the routine 400 (FIG. 4) to perform the aggregate task of storing data from the input source into the appropriate established partition.

After the data is distributed into the partitions, step 608 assigns each partition to one task execution unit. Preferably, step 604 was performed to provide an equal number of partitions and task execution units. However, if there are more partitions than task execution units, various techniques may be used to allocate partitions fairly among the task execution units. For example, known bin packing techniques may be employed. One well known bin packing technique, for example, is the Greedy method.

After step 608, each task execution unit 608 merges and orders the entries in its assigned partition. Then, in step 612, each task execution unit performs all subsequent pipeline processing steps upon the merged and ordered data. After step 612, the routine 600 ends in step 614.

Round Robin Sort

Still another mechanism to pool and redistribute data during multi-level processing is the Round Robin Sort technique. Broadly, the Round Robin Sort technique distributes the data into multiple identical "sort partitions" in rotation. This is performed to equitably allocate the processing of this data among the task execution units. Thus, there are preferably the same number of many sort partitions as task execution units. Preferably, each partition is structured to include multiple sort trees, thus avoiding concurrency conflicts from multiple task execution units simultaneously attempting to store data in the same partition.

Figure 7:
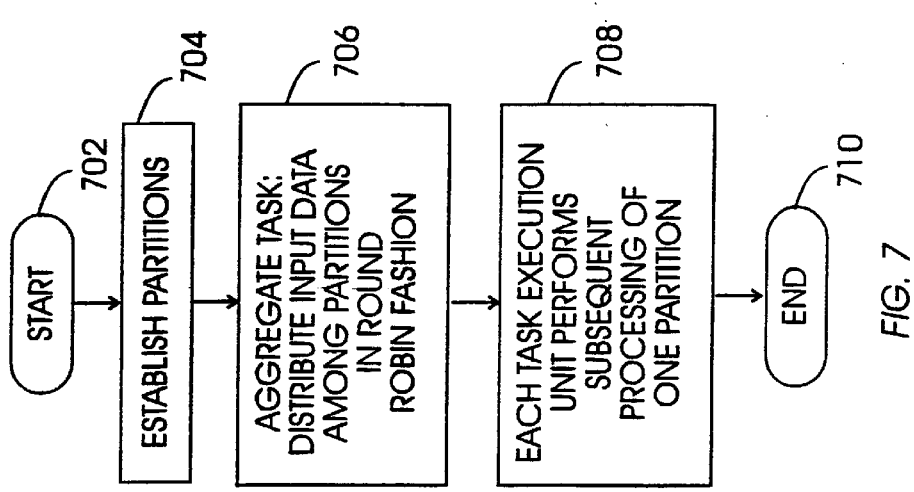
FIG. 7 is a flowchart illustrating a round robin sort technique for multi-level processing according to the invention.

FIG. 7 shows this process in greater detail. After the routine 700 starts in step 702, step 704 establishes the sort partitions. With partitions chosen according to the p-sort method described above, the data of each partition has a certain criteria, such as all names that hash to the same partition. In contrast, each Round Robin sort partition comprises a microcosm of the entire gamut of input data. Thus, each Round Robin sort partition can receive all names, regardless of their value.

After step 704, the task execution units in step 706 cooperatively perform the aggregate task of storing the input data into the sort partitions. Namely, utilizing the technique of FIG. 4, each of the task execution units 101–104 retrieves a data entry from the input source, performs pipeline query processing operations upon the data entry, and deposits the resultant data item(s) into the sort partitions. Within that sort partition, the data entry is placed according to a sort criteria. The sort criteria, however, does not determine which sort partition to place the data entry into. Each time a task execution unit performs pipeline query processing operations upon a data entry from the input source, it deposits the resultant data item(s) into different ones of the sort partitions according to a predetermined "round robin" order. Thus, each task execution unit evenly distributes data entries into all of the sort partitions.

After the input data is completely distributed into the sort partitions, the aggregate task of step 706 is complete. Next, in step 708, each task execution unit performs all subsequent processing of the data entries in one sort partition. As is the P-sort technique, the round robin approach may use a one-to-one or one-to-many mapping between task execution units and sort partitions. After step 708, the routine 700 ends in step 710.

Shared Sort

Figure 8:
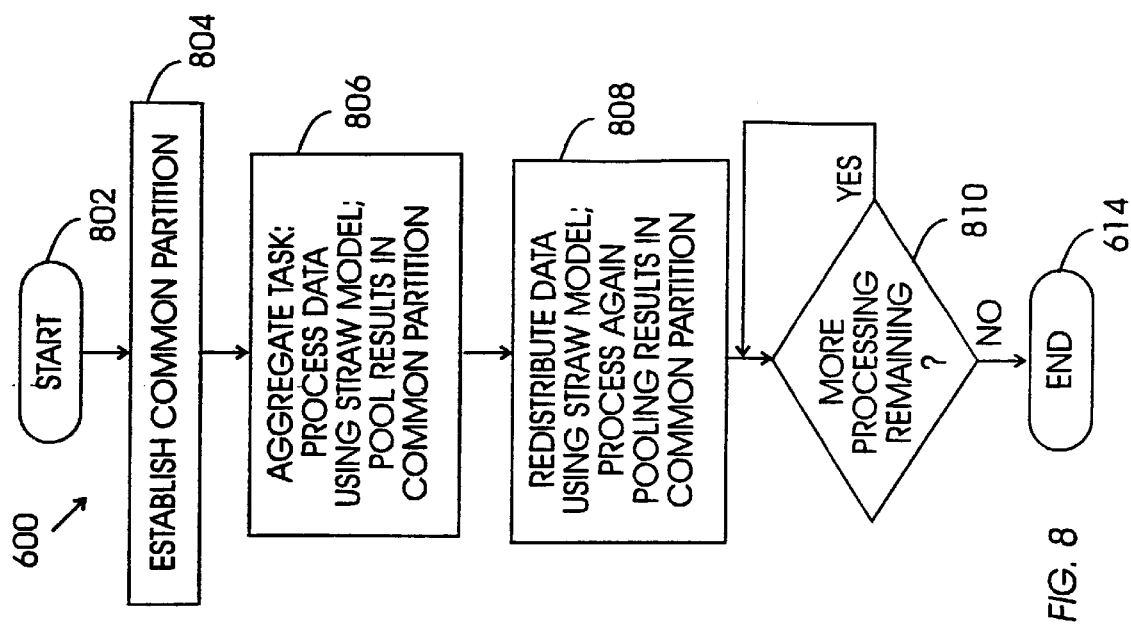
FIG. 8 is a flowchart illustrating a shared sort technique for multi-level processing according to the invention.

Still another mechanism to pool and redistribute data during multi-level processing is the Shared Sort technique. Broadly, in the Shared Sort technique, data is pooled into and distributed from a common partition using the straw model. FIG. 8 shows this process in greater detail. After the routine 800 starts in step 802, step 804 establishes the common partition. The common partition is accessible by all task execution units 101–104. Preferably, the common partition is structured to include multiple sort trees, thus avoiding concurrency conflicts from multiple task execution units simultaneously attempting to store data in the common partition.

In step 806, the first level of the multi-level processing is performed by concurrent operation of the task execution units 101–104. Preferably, the task execution units 101–104 operate according to the straw model, as shown in FIG. 4. Results of this level of processing are effectively pooled by storing them in the common partition. In step 808, the first level results are redistributed among the task execution units 101–104 and processed thereby, preferably using the straw model as discussed above. Accordingly, results of the processing of step 808 are again collected in the common partition.

Step 810 then asks whether any more processing remains to complete the overall work. If so, step 808 is repeated as necessary. When all work is completed, the routine 800 ends in step 812.

Accordingly, the routine 800 manages the task execution units 101–104 to "share" pooling and redistribution of data, rather than exclusively assigning partitions to specific task execution units as in the P-Sort technique (FIG. 6, 608) and in the Round Robin technique (FIG. 7, step 708).

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for machine-executed completion of an aggregate database processing task, comprising:

receiving a command to perform an aggregate database processing task; establishing at least one granularity unit for dividing the aggregate task into sub-tasks; and independently operating each one of multiple task execution units to sequentially and independently self-allocate and execute sub-tasks of the aggregate task on-demand, where each said sub-task is sized according to one of said at least one established granularity unit.

2. The method of claim 1, the at least one granularity comprising one granularity for dividing the aggregate task into sub-tasks of equal size.

3. The method of claim 1, the establishing of the at least one granularity unit comprising each task execution unit independently establishing a single granularity unit for each self-allocation of a sub-task by said task execution unit.

4. The method of claim 3, each of said at least one granularity unit comprising a sub-part of the database table selected from a list including: a row of the table, a predetermined number of multiple rows of the table, and a page of rows in the table.

5. The method of claim 1, the independent operation of each multiple task execution unit comprising, for each task execution unit, repeatedly performing a process comprising:

(1) selecting an unexecuted sub-task of the aggregate task, the sub-task being sized according to the established granularity;

(2) executing the selected sub-task;

(3) determining whether any unexecuted sub-tasks remain;

(4) repeating steps (1), (2), and (3) until no unexecuted sub-tasks remain.

6. The method of claim 1, the execution of the sub-tasks forming intermediate data, the method further comprising:

pooling the intermediate data to form a secondary aggregate task;

allocating the secondary aggregate task among the task execution units;

operating the task execution units to complete the allocated secondary aggregate task.

7. The method of claim 6, the allocating and operating comprising:

establishing at least one secondary granularity unit for dividing the secondary aggregate task into sub-tasks; and independently operating each one of multiple task execution units to sequentially self-allocate and execute sub-tasks of the secondary aggregate task on-demand, where each said sub-task is sized according to one of said at least one established secondary granularity unit.

8. The method of claim 6, the execution of sub-tasks forming intermediate data, wherein:

the method further comprises establishing a predetermined number of data storage partitions accessible to each of the task execution units;

the execution of sub-tasks of the aggregate task distributes each item of intermediate data into one of the partitions selected by applying a predetermined sorting criteria to the item of input data; and the method further comprises further processing data in each partition by assigning each partition to a task execution unit and processing data in each exclusively by the task execution unit assigned to that partition.

9. The method of claim 1, the execution of sub-task forming intermediate data, wherein:
the method further comprises establishing a predetermined number of sort partitions accessible to each of the task execution units;
the execution of sub-tasks of the aggregate task rotationally distributes input data into the sort partitions; and
the method further comprises performing further processing of data in each partition by assigning each partition to a task execution unit and processing data in each partition exclusively by the task execution unit assigned to that partition.

10. The method of claim 1, the execution of the sub-tasks forming intermediate data, the method further comprising:
pooling the intermediate data to form a secondary aggregate task;
establishing at least one secondary granularity unit for dividing the secondary aggregate task into sub-tasks;
independently operating each one of the multiple task execution units to sequentially self-allocate and execute sub-tasks of the secondary aggregate task on-demand, where each said sub-task is sized according to one of said at least one established secondary granularity unit.

11. The method of claim 10, the pooling step comprising:
establishing a data storage partition accessible to each of the task execution units; and
placing the intermediate data into the partition.

12. The method of claim 11, the partition including multiple sort trees each sort tree being accessible to each of the task execution units.

13. The method of claim 8, each of the data storage partitions including multiple sort trees each sort tree being accessible to each of the task execution units.

14. The method of claim 9, each of the sort partitions including multiple sort trees each sort tree being accessible to each of the task execution units.

15. A programmed product comprising signal-bearing media tangibly embodying a program of machine-readable instructions executable by a digital processing apparatus to perform a method for machine-executed completion of an aggregate task, said method comprising:
receiving a command to perform an aggregate task;
establishing a granularity for dividing the aggregate task into sub-tasks; and
independently operating each one of multiple task execution units to sequentially and independently self-allocate and execute sub-tasks of the aggregate task on-demand, where said sub-tasks are sized according to the established granularity.

16. The product of claim 15, the at least one granularity comprising one granularity for dividing the aggregate task into sub-tasks of equal size.

17. The product of claim 15, the establishing of the at least one granularity unit comprising each task execution unit independently establishing a single granularity unit for each self-allocation of a sub-task by said task execution unit.

18. The product of claim 17, the unit of granularity comprising a sub-part of the table selected from a list including: a row of the table, a predetermined number of multiple rows of the table, and a page of the table.

19. The product of claim 15, the independent operation of each multiple task execution unit comprising, for each task execution unit, repeatedly performing a process comprising:
(1) selecting an unexecuted sub-task of the aggregate task, the sub-task being sized according to the established granularity;
(2) executing the selected sub-task;
(3) determining whether any unexecuted sub-tasks remain;
(4) repeating steps (1), (2), and (3) until no unexecuted sub-tasks remain.

20. The product of claim 15, the execution of the sub-tasks forming intermediate results, the method further comprising:
pooling the intermediate data to form a secondary aggregate task;
allocating the secondary aggregate task among the task execution units;
operating the task execution units to complete the allocated secondary aggregate task.

21. The product of claim 20, the allocating and operating comprising:
establishing at least one secondary granularity unit for dividing the secondary aggregate task into sub-tasks; and
independently operating each one of multiple task execution units to sequentially self-allocate and execute sub-tasks of the secondary aggregate task on-demand, where each said sub-task is sized according to one of said at least one established secondary granularity unit.

22. The product of claim 15, wherein:
the method further comprises establishing a predetermined number of data storage partitions accessible to each of the task execution units;
the execution of sub-tasks of the aggregate task distributes each item of intermediate data into one of the partitions selected by applying a predetermined sorting criteria to the item of input data; and
method further comprises further processing data in each partition by assigning each partition to a task execution unit and processing data in each exclusively by the task execution unit assigned to that partition.

23. The product of claim 15, wherein:
the method further comprises establishing a predetermined number of sort partitions accessible to each of the task execution units;
the execution of sub-tasks of the aggregate task rotationally distributes input data into the sort partitions; and
the method further comprises performing further processing of data in each partition by assigning each partition to a task execution unit and processing data in each partition exclusively by the task execution unit assigned to that partition.

24. The product of claim 15, the execution of sub-tasks forming intermediate data, the method further comprising:
pooling the intermediate data to form a secondary aggregate task;
establishing at least one secondary granularity unit for dividing the secondary aggregate task into sub-tasks;
independently operating each one of the multiple task execution units to sequentially self-allocate and execute sub-tasks of the secondary aggregate task on-demand, where each said sub-task is sized according to one of said at least one established secondary granularity unit.

25. The product of claim 24, the pooling step comprising:
establishing a data storage partition accessible to each of the task execution units; and
placing the intermediate data into the partition.

26. The product of claim 25, the partition including multiple sort trees each sort tree being accessible to each of the task execution units.

27. The product of claim 22, each of the data storage partitions including multiple sort trees each sort tree being accessible to each of the task execution units.

28. The product of claim 23, each of the sort partitions including multiple sort trees each sort tree being accessible to each of the task execution units.

29. A multiprocessing system, comprising:
a first data storage unit containing an input data structure having a plurality of data entries;
a second data storage unit;
multiple task execution units each coupled to the first and second data storage units,
said task execution units being programmed to cooperatively perform a method for machine-executed completion of an aggregate task, said method comprising:
independently operating each one of the multiple task execution units to sequentially and independently self-allocate and execute sub-tasks of the aggregate task on-demand, where said sub-tasks are sized according to a predetermined established granularity.

30. The system of claim 29, the at least one granularity comprising one granularity for dividing the aggregate task into sub-tasks of equal size.

31. The system of claim 29, the establishing of the at least one granularity unit comprising each task execution unit independently establishing a single granularity unit for each self-allocation of a sub-task by said task execution unit.

32. The system of claim 31, the unit of granularity comprising a sub-part of the table selected from a list including: a row of the table, a predetermined number of multiple rows of the table, and a page of the table.

33. The system of claim 29, the independent operation of each multiple task execution unit comprising, for each task execution unit, repeatedly performing a process comprising:
(1) selecting an unexecuted sub-task of the aggregate task, the sub-task being sized according to the established granularity;
(2) executing the selected sub-task;
(3) determining whether any unexecuted sub-tasks remain;
(4) repeating steps (1), (2), and (3) until no unexecuted sub-tasks remain.

34. The system of claim 29, the execution of the sub-tasks forming intermediate results, the method further comprising:
pooling the intermediate data to form a secondary aggregate task;
allocating the secondary aggregate task among the task execution units;
operating the task execution units to complete the allocated secondary aggregate task.

35. The system of claim 34, the allocating and operating comprising:
establishing at least one secondary granularity unit for dividing the secondary aggregate task into sub-tasks; and
independently operating each one of multiple task execution units to sequentially self-allocate and execute sub-tasks of the secondary aggregate task on-demand, where each said sub-task is sized according to one of said at least one established secondary granularity unit.

36. The system of claim 34, wherein:
the method further comprises establishing a predetermined number of data
storage partitions accessible to each of the task execution units; the execution of sub-tasks of the aggregate task distributes each item of intermediate data into one of the partitions selected by applying a predetermined sorting criteria to the item of input data; and
the method further comprises further processing dam in each partition by assigning each partition to a task execution unit and processing data in each exclusively by the rusk execution unit assigned to that partition.

37. The system of claim 34, wherein:
the method further comprises establishing a predetermined number of son partitions accessible to each of the task execution units;
the execution of sub-tasks of the aggregate task rotationally distributes input data into the sort partitions; and
the method further comprises performing further processing of data in each partition by assigning each partition to a task execution unit and processing data in each partition exclusively by the task execution unit assigned to that partition.

38. The system of claim 29, the execution of sub-tasks forming intermediate data, the method further comprising:
pooling the intermediate data to form a secondary aggregate task;
establishing at least one secondary granularity unit for dividing the secondary aggregate task into sub-tasks;
independently operating each one of the multiple task execution units to sequentially self-allocate and execute sub-tasks of the secondary aggregate task on-demand, where each said sub-task is sized according to one of said at least one established secondary granularity unit.

39. The method of claim 38, the pooling step comprising:
establishing a data storage partition accessible to each of the task execution units; and
placing the intermediate data into the partition.

40. The method of claim 39, the partition including multiple sort trees each sort tree being accessible to each of the task execution units.

41. The method of claim 36, each of the data storage partitions including multiple sort trees each sort tree being accessible to each of the task execution units.

42. The method of claim 37, each of the sort partitions including multiple sort trees each sort tree being accessible to each of the task execution units.

43. A multiprocessing system, comprising:
a first data storage means for storing an input data structure having a plurality of data entries;
a second data storage means; and
multiple task execution means each coupled to the first and second data storage means, independently operable for sequentially and independently self-allocating and executing sub-tasks of an aggregate task on-demand, where said sub-tasks are sized according to a predetermined established granularity.

* * * * *

UNITED STATES PATENT AND TRADEMARK OFFICE
CERTIFICATE OF CORRECTION

PATENT NO. : 6,304,866 B1  
DATED : October 16, 2001  
INVENTOR(S) : Chow et al.

Page 1 of 1

It is certified that error appears in the above-identified patent and that said Letters Patent is hereby corrected as shown below:

<u>Title page,</u>
Item [74], *Attorney, Agent, or Firm*, should read
-- 1. Baker, Maxham, Jester, Meador;
2. Gray Carey Ware & Freidenrich; and
3. McGinn & Gibb, PLLC --

Item [75], Inventors,
Line 3, change "(CA)" to -- Ontario (US) --

<u>Column 10,</u>
Line 9, after "sub-tasks" add -- , said aggregate task comprising applying a predetermined process to a database table --

<u>Column 11,</u>
Line 51, after "sub-tasks" add -- , said aggregate task comprising applying a predetermined process to a database table --

<u>Column 13,</u>
Line 23, after "aggregate task," add -- said aggregate task comprising applying a predetermined process to a database table, --

<u>Column 14,</u>
Line 65, after "granularity", add -- ,said aggregate task comprising applying a predetermined process to a database table. --

Signed and Sealed this

Sixteenth Day of July, 2002

*Attest:*

JAMES E. ROGAN
*Director of the United States Patent and Trademark Office*

*Attesting Officer*